United States Patent
Liu et al.

(10) Patent No.: US 8,368,375 B2
(45) Date of Patent: Feb. 5, 2013

(54) SWITCHING REGULATOR WITH TRANSIENT CONTROL FUNCTION AND CONTROL CIRCUIT AND METHOD THEREFOR

(75) Inventors: Kuo-Chi Liu, Hsinchu (TW); Heng-Sheng Chao, Chupei (TW)

(73) Assignee: Richtek Technology Corporation, Hsin-Chu (TW)

( * ) Notice: Subject to any disclaimer, the term of this patent is extended or adjusted under 35 U.S.C. 154(b) by 384 days.

(21) Appl. No.: 12/803,140

(22) Filed: Jun. 18, 2010

(65) Prior Publication Data
US 2011/0037448 A1    Feb. 17, 2011

(30) Foreign Application Priority Data
Aug. 17, 2009   (TW) ............................... 98127645 A (51) Int. Cl.
*G05F 1/44* (2006.01)
(52) U.S. Cl. .................................................. 323/284
(58) Field of Classification Search .............. 323/222, 323/282–285, 351
See application file for complete search history.

(56) References Cited

U.S. PATENT DOCUMENTS

| | | | |
|---|---|---|---|
| 6,104,759 A * | 8/2000 | Carkner et al. ................ | 375/295 |
| 6,385,058 B1 * | 5/2002 | O'Meara ...................... | 363/21.01 |
| 6,580,258 B2 * | 6/2003 | Wilcox et al. ................ | 323/282 |
| 6,856,654 B1 * | 2/2005 | Carkner et al. ............... | 375/295 |
| 7,135,841 B1 * | 11/2006 | Tomiyoshi et al. ........... | 323/224 |
| 7,199,560 B2 * | 4/2007 | Cheung et al. ................ | 323/222 |
| 7,579,816 B2 * | 8/2009 | Wu .............................. | 323/282 |
| 7,782,036 B1 * | 8/2010 | Wong et al. .................... | 323/282 |
| 7,808,222 B2 * | 10/2010 | Ueunten ........................ | 323/271 |
| 8,058,859 B2 * | 11/2011 | Xu ................................ | 323/284 |
| 8,098,048 B2 * | 1/2012 | Hoff ............................. | 320/120 |

* cited by examiner

*Primary Examiner* — Adolf Berhane
(74) *Attorney, Agent, or Firm* — Tung & Associates (57) ABSTRACT

The present invention discloses a switching regulator with transient control function, and a control circuit and a method for controlling the switching regulator. The switching regulator with transient control function includes: a power conversion circuit for receiving an input voltage and converting the input voltage to an output voltage; a feedback circuit for detecting the output voltage and generating a feedback signal representing the output voltage; an output capacitor coupled to an output terminal of the power conversion circuit; and a control circuit for receiving the feedback signal and generating a control signal to control the conversion operation by the power conversion circuit accordingly, wherein the control circuit includes a voltage balancing circuit which discharges the output capacitor when the output voltage is higher than a first predetermined threshold, and charges the output capacitor when the output voltage is lower than a second predetermined threshold.

12 Claims, 7 Drawing Sheets

SWITCHING REGULATOR WITH TRANSIENT CONTROL FUNCTION AND CONTROL CIRCUIT AND METHOD THEREFOR

CROSS REFERENCE

The present invention claims priority to Taiwan patent application No. 098127645, filed on Aug. 17, 2009.

BACKGROUND OF THE INVENTION

1. Field of Invention

The present invention relates to a switching regulator with transient control function and a control circuit and a method therefor.

2. Description of Related Art

Figure 1:
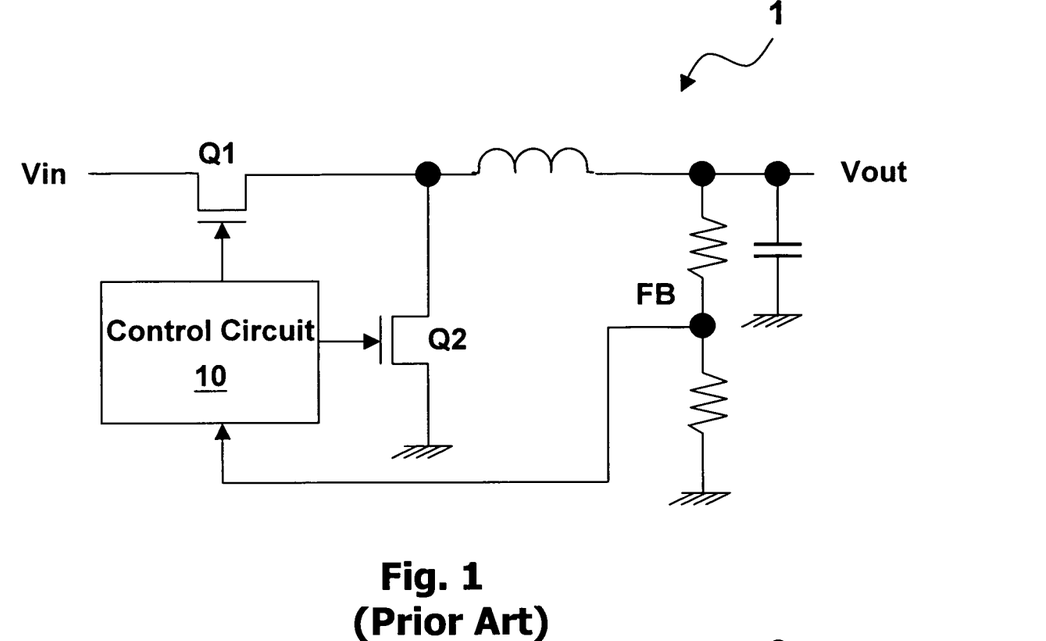
FIGS. 1-4 show prior art synchronous buck switching regulator, boost switching regulator, inverter switching regulator, and buck-boost switching regulator, respectively.
Figure 2:
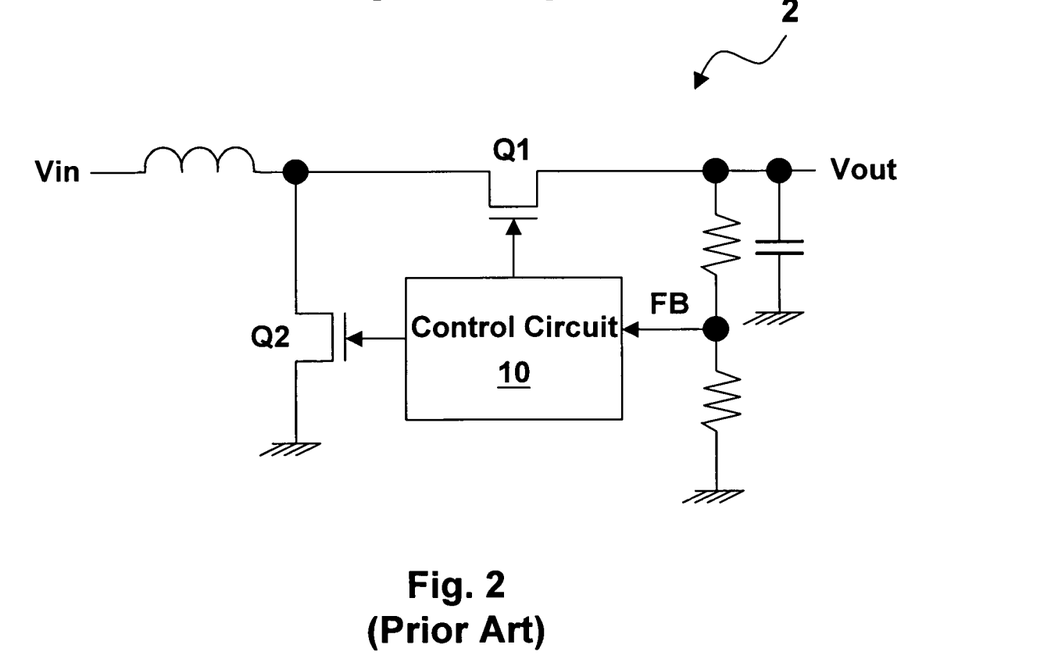
Figure 3:
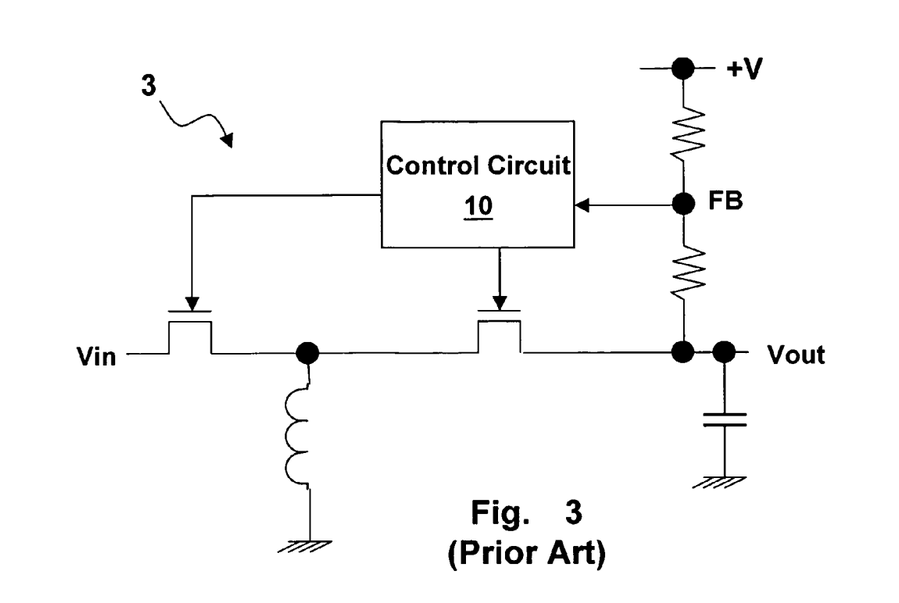
Figure 4:
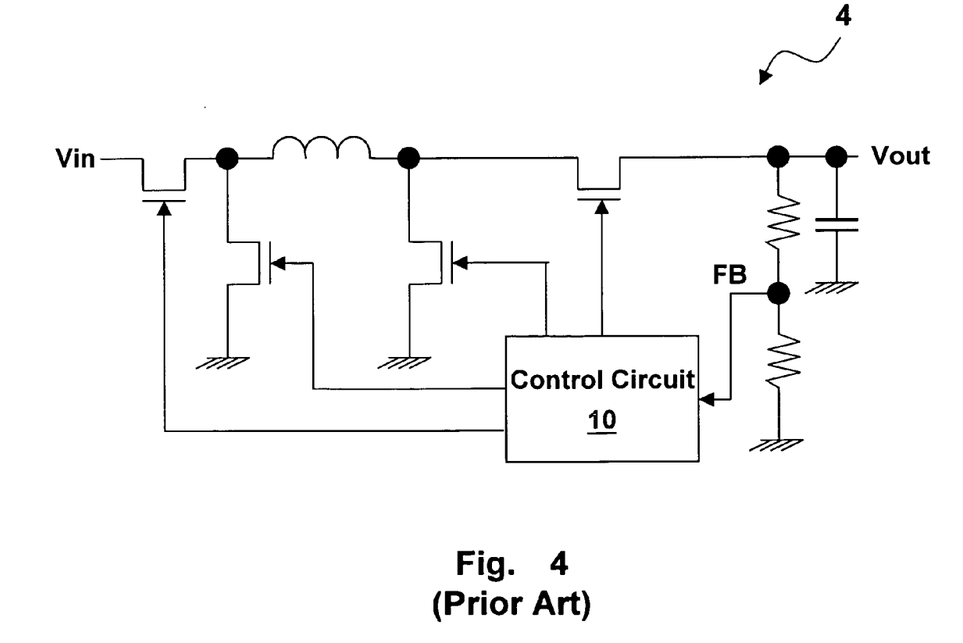
Figure 5:
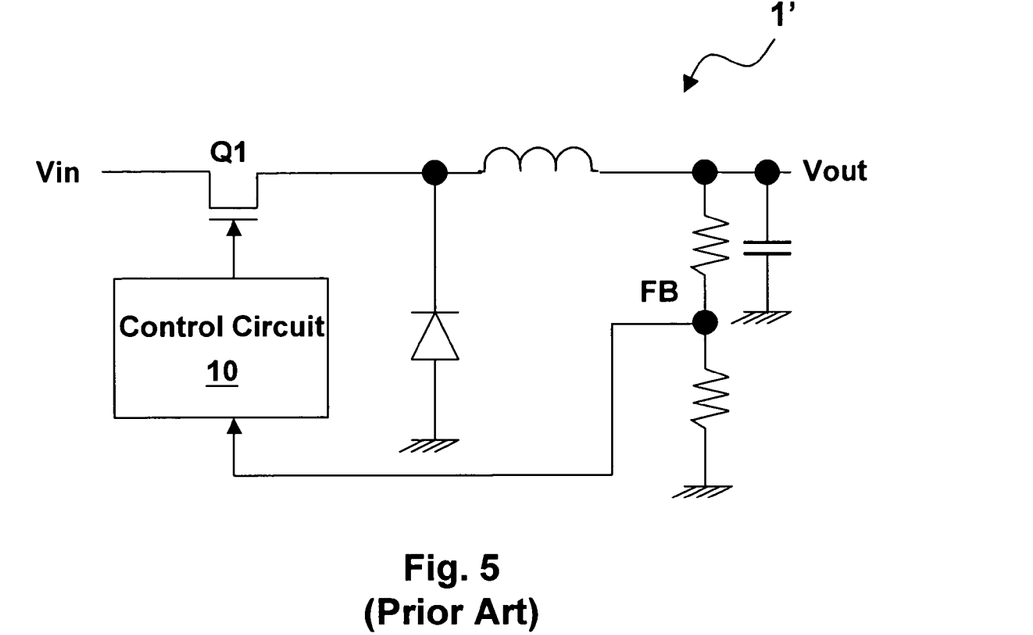
FIGS. 5 and 6 show prior art asynchronous buck switching regulator and boost switching regulator, respectively.
Figure 6:
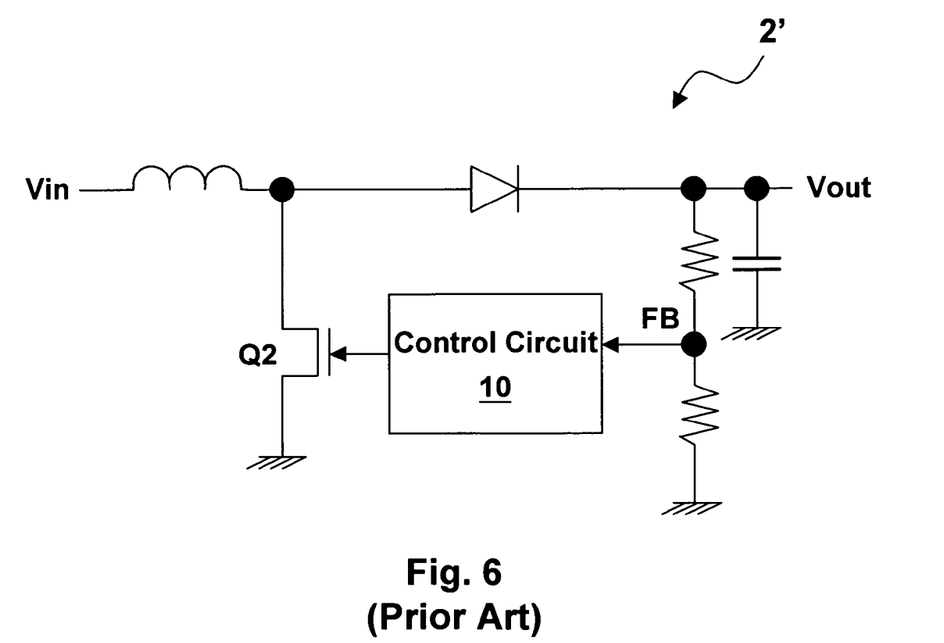

There are various types of switching regulators, such as buck converter, boost converter, inverter converter, buck-boost converter and so on. The foregoing circuits can also be categorized into synchronous type and asynchronous type; a synchronous switching regulator employs two power transistor switches (the buck-boost converter employs four power transistor switches), while in an asynchronous switching regulator one of the power transistor switches is replaced by a diode. Taking a synchronous buck converter for example, its circuit structure is shown schematically in FIG. 1. The buck converter 1 includes two power transistor switches Q1 and Q2 controlled by a control circuit 10. The control circuit 10 generates a switch control signal according to a feedback signal FB generated from an output terminal Vout, to control the operation of the power transistor switches Q1 and Q2 such that power is transmitted from an input terminal Vin to an output terminal Vout. FIG. 2 shows a boost converter 2; FIG. 3 shows an inverter converter 3; FIG. 4 shows a buck-boost converter 4; FIG. 5 shows an asynchronous buck switching regulator 1'; and FIG. 6 shows an asynchronous boost switching regulator 2'. Although the foregoing circuits have different circuit structures and different numbers of power transistor switches, they all convert power from the input terminal Vin to the output terminal Vout by controlling the power transistor switches with the switch control signals generated by the control circuit 10 according to the feedback signal FB.

Figure 7:
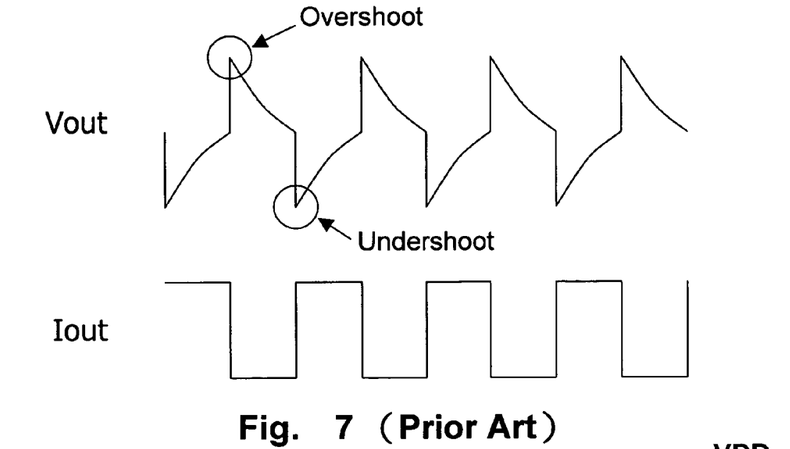
FIG. 7 shows a problem in the prior art.

There are two types of feedback control mechanisms employed in the foregoing switching regulators: voltage mode and current mode. However, in either mode, when the load current changes abruptly, it will cause output voltage overshoot or undershoot, generating a larger ripple at the output terminal as shown in FIG. 7.

In view of the drawback of the foregoing prior art, the present invention provides a switching regulator with transient control function and a control circuit and a method therefor to improve the transient response and reduce the voltage ripple.

SUMMARY OF THE INVENTION

An objective of the present invention is to provide a switching regulator.

Another objective of the present invention is to provide a control circuit for the switching regulator.

Yet another objective of the present invention is to provide a method for controlling the switching regulator.

To achieve the foregoing objectives, in one perspective of the present invention, it provides a switching regulator with transient control function, comprising: a power conversion circuit for receiving an input voltage and converting the input voltage to an output voltage; a feedback circuit for detecting the output voltage and generating a feedback signal representing the output voltage; an output capacitor coupled to an output terminal of the power conversion circuit; and a control circuit for receiving the feedback signal and generating a control signal to control the conversion operation by the power conversion circuit accordingly, wherein the control circuit includes a voltage balancing circuit which discharges the output capacitor when the output voltage is higher than a first predetermined threshold, and charges the output capacitor when the output voltage is lower than a second predetermined threshold.

In the foregoing switching regulator, the voltage balancing circuit may include: a first comparator for comparing the feedback signal with a first reference signal to determine whether the output voltage is higher than the first predetermined threshold; a second comparator for comparing the feedback signal with a second reference signal to determine whether the output voltage is lower than the second predetermined threshold; a first switch coupled between the output capacitor and a voltage node having a lower voltage level than the output voltage, wherein the first switch is turned on when the output voltage is determined to be higher than the first predetermined threshold; and a second switch coupled between the output capacitor and a supplied voltage, wherein the second switch is turned on when the output voltage is determined to be lower than the second predetermined threshold.

The foregoing voltage balancing circuit preferably includes an auxiliary capacitor.

In another perspective, the present invention provides a control circuit for a switching regulator, wherein the switching regulator receives an input voltage and generates an output voltage at an output terminal, the output terminal being coupled to an output capacitor, the control circuit comprising: an error amplifier for receiving a feedback signal representing the output voltage and comparing the feedback signal with a first reference signal; a PWM generator for generating a PWM signal according to an output of the error amplifier; a first comparator for comparing the feedback signal with a second reference signal to determine whether the output voltage is higher than a first predetermined threshold; a second comparator for comparing the feedback signal with a third reference signal to determine whether the output voltage is lower than a second predetermined threshold; a first switch coupled between the output capacitor and a voltage node having a lower voltage level than the output voltage, wherein the first switch is turned on when the output voltage is determined to be higher than the first predetermined threshold; and a second switch coupled between the output capacitor and a supplied voltage, wherein the second switch is turned on when the output voltage is determined to be lower than the second predetermined threshold.

In yet another perspective of the present invention, it provides a method for controlling a switching regulator, comprising: providing a power conversion circuit for receiving an input voltage and converting the input voltage to an output voltage; providing an output capacitor coupled to an output terminal of the power conversion circuit; detecting the output voltage and generating a feedback signal representing the output voltage; generating a control signal according to the feedback signal to control the conversion operation of the power conversion circuit; controlling the output capacitor according to the feedback signal to discharge the output capacitor when the output voltage is higher than a first predetermined threshold, and charge the output capacitor when the output voltage is lower than a second predetermined threshold.

The objectives, technical details, features, and effects of the present invention will be better understood with regard to the detailed description of the embodiments below, with reference to the drawings.

DESCRIPTION OF THE PREFERRED EMBODIMENTS

Figure 8:
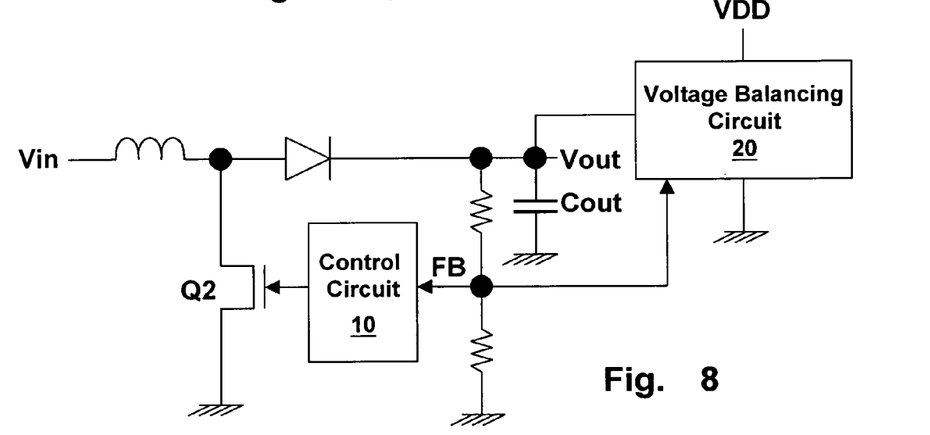
FIG. 8 shows an asynchronous boost switching regulator by way of example to illustrate the present invention.

Please refer to FIG. 8, an asynchronous boost switching regulator is shown by way of example to illustrate the present invention. However, the present invention is not limited to the asynchronous boost switching regulator and can be applied similarly to other types of synchronous or asynchronous switching regulators. FIG. 8 shows the first embodiment of the present invention, wherein a voltage balancing circuit 20 is provided, in addition to the basic circuit structure of an asynchronous boost switching regulator. The voltage balancing circuit 20 can be entirely or partially integrated with a control circuit 10 to become an integrated circuit. The voltage balancing circuit 20 is provided for: (1) releasing the energy stored in an output capacitor Cout when the output voltage Vout is too high, and (2) supplying energy to the output capacitor Cout when the output voltage Vout is too low. As such, the switching regulator has a transient control function which can improve the transient response and reduce the voltage ripple.

Figure 9:
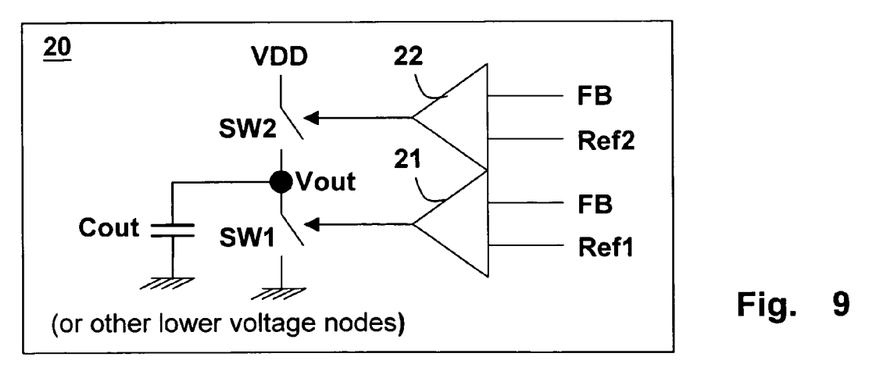
FIG. 9 shows an embodiment of the present invention.

The voltage balancing circuit 20 can be embodied in various forms. FIG. 9 shows one embodiment by way of example: Comparators 21 and 22 respectively compare a feedback signal FB representing the output voltage Vout with reference signals REF1 and REF2, and control switches SW1 and SW2 accordingly. Referring to FIG. 9 in conjunction with FIG. 11, when the feedback signal FB is higher than the first reference signal REF1, indicating that an overshoot will occur, the output of the comparator 21 turns on the switch SW1, so that the output capacitor Cout is discharged toward ground (or toward any voltage node having a voltage level lower than the output voltage Vout); thus, the output voltage Vout is decreased to avoid or minimize the overshoot. Similarly, when the feedback signal FB is lower than the second reference signal REF2, indicating that an undershoot will occur, the output of the comparator 22 turns on the switch SW2, so that the supplied voltage VDD charges the output capacitor Cout to increase the output voltage Vout, avoiding or minimizing the undershoot. In this circuit diagram, the positive and negative inputs of the comparators 21 and 22 can be arranged according to the types of the switches SW1 and SW2.

Figure 10:
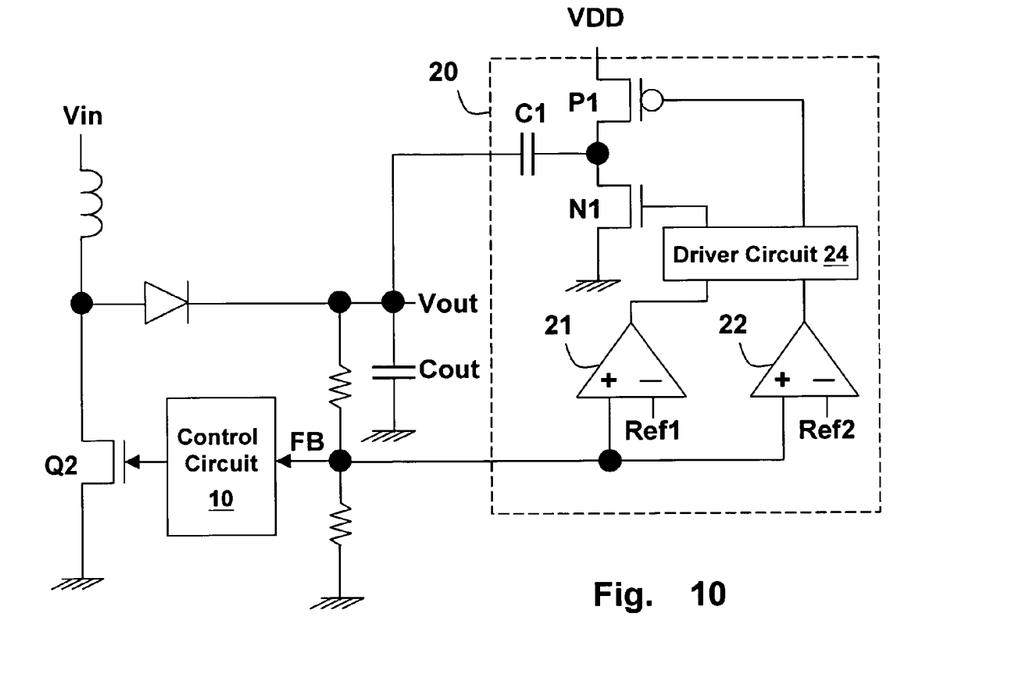
FIG. 10 shows another embodiment of the present invention.

In the embodiment shown in FIG. 9, the supplied voltage VDD should charge the output capacitor Cout when an undershoot is about to occur; hence, the supplied voltage VDD should be at least equal to or higher than the normal output voltage Vout. FIG. 10 shows another embodiment of the present invention, wherein the switches SW1 and SW2 are embodied by an NMOS transistor N1 and a PMOS transistor P1 respectively (which are for example only; the switches can certainly be both NMOS or both PMOS transistors). The outputs of the comparators 21 and 22 can drive the NMOS transistor N1 and the PMOS transistor P1 directly, however in this embodiment, they drive the transistors N1 and P1 via a driver circuit 24 so that the transistors N1 and P1 can be fully turned ON. This embodiment has a feature which is different from the previous embodiment, that is, an additional auxiliary capacitor C1 is provided.

Figure 11:
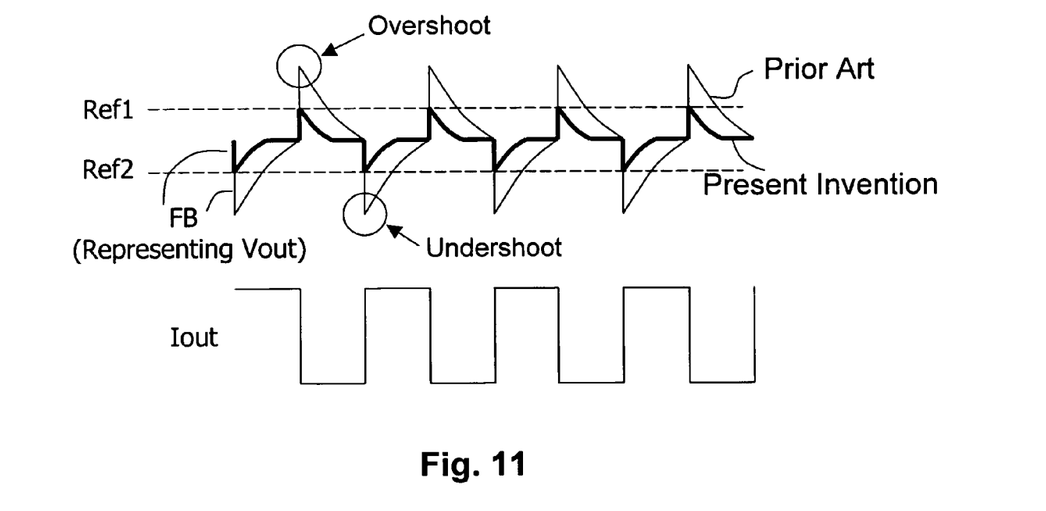
FIG. 11 shows the effect achieved by the present invention.

Referring to FIG. 10 in conjunction with FIG. 11, when the feedback signal FB is higher than the first reference signal REF1, indicating that an overshoot will occur, the output of the comparator 21 turns on the NMOS transistor N1, so that the output capacitor Cout charges the auxiliary capacitor C1. Thus, on the one hand, the output voltage Vout can be decreased; on the other hand, energy can be stored in the auxiliary capacitor C1. When the feedback signal FB is lower than the second reference signal REF2, indicating that an undershoot will occur, the output of the comparator 22 turns on the PMOS transistor P1. In this case, the energy stored within the auxiliary capacitor C1 adds on the supplied voltage VDD; the auxiliary capacitor C1 charges the output capacitor Cout to increase the output voltage Vout. As seen from the above, by the operation of the auxiliary capacitor C1, the supplied voltage VDD is not required to be equal to or higher than the normal output voltage Vout. In fact, the supplied voltage VDD can be any voltage higher than ground, as long as the auxiliary capacitor C1 has a sufficiently large capacitance. This means that a proper supplied voltage VDD can be easily and conveniently acquired from inside or outside of the circuit.

Figure 12:
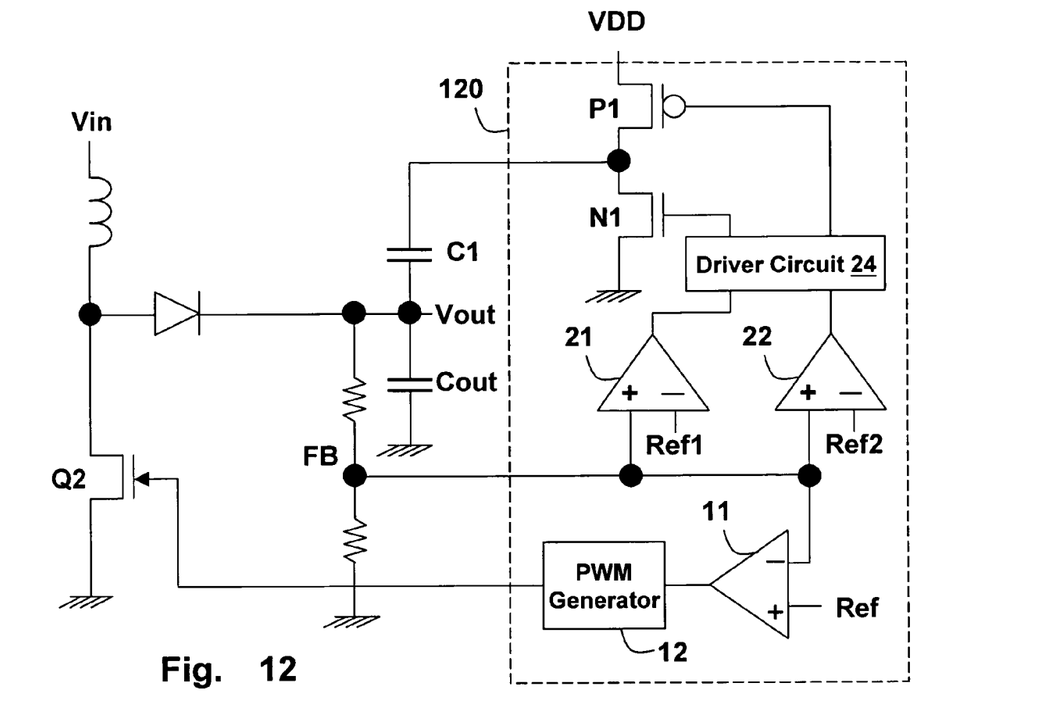
FIG. 12 shows that a voltage balancing circuit can be partially or entirely integrated with a control circuit 10 to become an integrated circuit 120.

FIG. 12 illustrates that most part of the voltage balancing circuit 20, except the auxiliary capacitor C1, can be integrated with the control circuit 10 to become one integrated circuit 120. In the integrated circuit 120, an error amplifier 11 compares the feedback signal FB with the reference signal REF; and the PWM generator 12 generates a PWM signal according to the output of the error amplifier 11 to control the operation of the power transistor Q2. Alternatively, the auxiliary capacitor C1 can also be integrated with the rest of the voltage balancing circuit 20 and the control circuit 10 in the integrated circuit 120.

Figure 13:
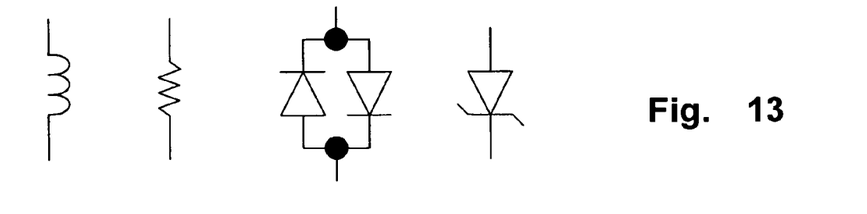
FIG. 13 illustrates that an additional energy-storage or voltage-drop device can be provided in addition to, or to replace, the auxiliary capacitor C1.

The auxiliary capacitor C1 is not the only device that can be provided in the path for charging and discharging the output capacitor Cout. In addition to or to replace for the auxiliary capacitor C1, other types of energy-storage or voltage-drop devices can be provided, for example but not limited to an inductor, resistor, diode, zener diode, etc; Or, an active device such as a transistor can also be provided to achieve a function similar to the foregoing devices.

Figure 14:
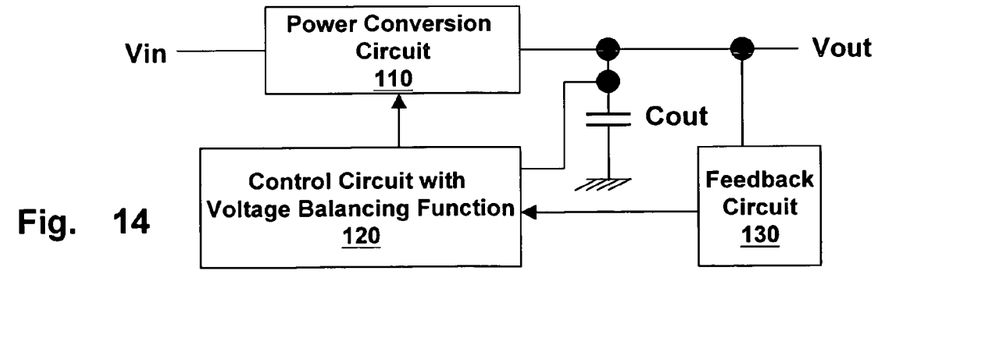
FIG. 14 summarizes the concept of the present invention.
Figure 15A:
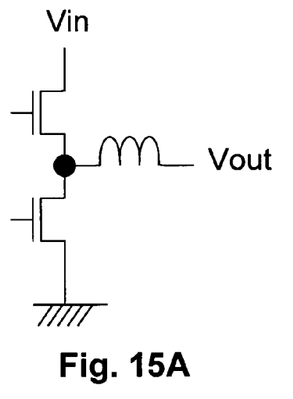
FIGS. 15A-15G illustrates that the present invention can be applied to various types of switching regulators.
Figure 15B:
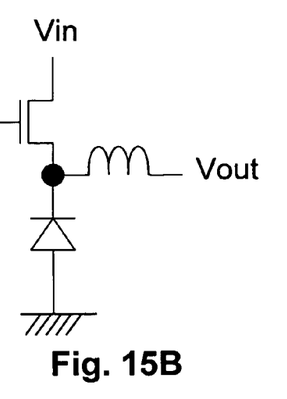
Figure 15C:
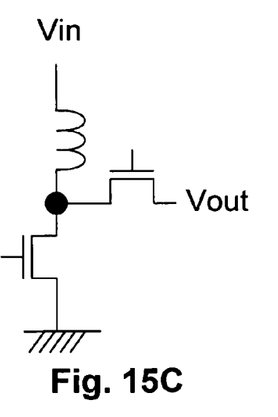
Figure 15D:
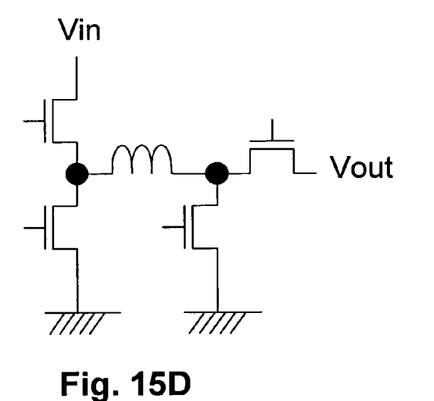
Figure 15E:
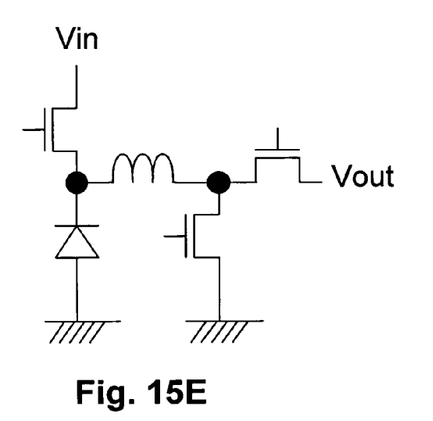
Figure 15F:
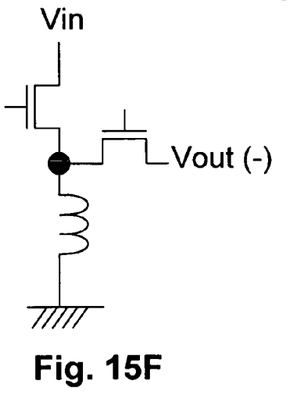
Figure 15G:
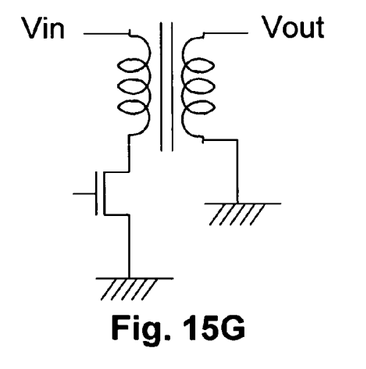

In summary, the concept of the present invention is shown in FIG. 14. A power conversion circuit 110 receives an input voltage Vin; A feedback circuit 130 detects an output voltage Vout and generates a feedback signal which is sent to a control circuit 120; the control circuit 120 controls the power conversion circuit 110 to convert the input voltage Vin to the output voltage Vout, and the control circuit 120 has a voltage balancing function capable of charging and discharging an output capacitor Cout. Among these, the power conversion circuit 110 can be any type of synchronous or asynchronous switching regulator, for example but not limited to the circuits shown in FIGS. 15A-15G.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. As one example, an additional circuit device which does not substantially affect the primary function of the circuit can be interposed between two devices shown to be in direct connection in the embodiments of the present invention. As another example, in FIGS. 8, 10, and 12, the supplied voltage VDD can be acquired from inside of the circuit. In view of the foregoing, the spirit of the present invention should cover all such and other modifications and variations, which should be interpreted to fall within the scope of the following claims and their equivalents.

What is claimed is:

1. A switching regulator with transient control function, comprising:
    a power conversion circuit for receiving an input voltage and converting the input voltage to an output voltage;
    a feedback circuit for detecting the output voltage and generating a feedback signal representing the output voltage;
    an output capacitor coupled to an output terminal of the power conversion circuit; and
    a control circuit for receiving the feedback signal and generating a control signal to control the conversion operation by the power conversion circuit accordingly,
    wherein the control circuit includes a voltage balancing circuit which compares the feedback signal with a first reference signal to determine whether the output voltage is higher than a first predetermined threshold and compares the feedback signal with a second reference signal to determine whether the output voltage is lower than a second predetermined threshold, wherein the voltage balancing circuit discharges the output capacitor when the output voltage is higher than the first predetermined threshold, and the voltage balancing circuit charges the output capacitor when the output voltage is lower than the second predetermined threshold.

2. The switching regulator of claim 1, wherein the voltage balancing circuit includes:
    a first comparator for comparing the feedback signal with a first reference signal to determine whether the output voltage is higher than the first predetermined threshold;
    a second comparator for comparing the feedback signal with a second reference signal to determine whether the output voltage is lower than the second predetermined threshold;
    a first switch coupled between the output capacitor and a voltage node having a lower voltage level than the output voltage, wherein the first switch is turned on when the output voltage is determined to be higher than the first predetermined threshold; and
    a second switch coupled between the output capacitor and a supplied voltage, wherein the second switch is turned on when the output voltage is determined to be lower than the second predetermined threshold.

3. The switching regulator of claim 2, wherein the first and second switches are coupled to a common node, and the voltage balancing circuit further includes an auxiliary capacitor coupled between the output capacitor and the common node.

4. The switching regulator of claim 2, wherein the first and second switches are coupled to a common node, and the voltage balancing circuit further includes one or more of the following devices coupled between the output capacitor and the common node: an inductor, a resistor, a diode, a zener diode, and a transistor.

5. The switching regulator of claim 2, wherein the first and second comparators drive the first and second switches via a driver gate respectively.

6. A control circuit for a switching regulator, wherein the switching regulator receives an input voltage and generates an output voltage at an output terminal, the output terminal being coupled to an output capacitor, the control circuit comprising:
    an error amplifier for receiving a feedback signal representing the output voltage and comparing the feedback signal with a first reference signal;
    a PWM generator for generating a PWM signal according to an output of the error amplifier;
    a first comparator for comparing the feedback signal with a second reference signal to determine whether the output voltage is higher than a first predetermined threshold;
    a second comparator for comparing the feedback signal with a third reference signal to determine whether the output voltage is lower than a second predetermined threshold;
    a first switch coupled between the output capacitor and a voltage node having a lower voltage level than the output voltage, wherein the first switch is turned on when the output voltage is determined to be higher than the first predetermined threshold; and
    a second switch coupled between the output capacitor and a supplied voltage, wherein the second switch is turned on when the output voltage is determined to be lower than the second predetermined threshold.

7. The control circuit of claim 6, wherein the first and second switches are coupled to a common node, and the control circuit further comprises an auxiliary capacitor coupled between the output capacitor and the common node.

8. The control circuit of claim 6, wherein the first and second switches are coupled to a common node, and the control circuit further comprises one or more of the following devices coupled between the output capacitor and the common node: an inductor, a resistor, a diode, a zener diode, and a transistor.

9. The control circuit of claim 6, wherein the first and second comparators drive the first and second switches via a driver gate respectively.

10. A method for controlling a switching regulator, comprising: providing a power conversion circuit for receiving an input voltage and converting the input voltage to an output voltage;
    providing an output capacitor coupled to an output terminal of the power conversion circuit;
    detecting the output voltage and generating a feedback signal representing the output voltage;
    generating a control signal according to the feedback signal to control the conversion operation of the power conversion circuit;

comparing the feedback signal with a first reference signal to determine whether the output voltage is higher than a first predetermined threshold;
comparing the feedback signal with a second reference signal to determine whether the output voltage is lower than a second predetermined threshold; and
controlling the output capacitor according to the feedback signal to discharge the output capacitor when the output voltage is higher than the first predetermined threshold, and charge the output capacitor when the output voltage is lower than the second predetermined threshold.

11. The method of claim 10, wherein the output capacitor has a first end coupled to ground, and a second end coupled to one or more of the following devices: an inductor, a resistor, a diode, a zener diode, and a transistor.

12. A method for controlling a switching regulator, comprising: providing a power conversion circuit for receiving an input voltage and converting the input voltage to an output voltage;
providing an output capacitor coupled to an output terminal of the power conversion circuit;
detecting the output voltage and generating a feedback signal representing the output voltage;
generating a control signal according to the feedback signal to control the conversion operation of the power conversion circuit;
controlling the output capacitor according to the feedback signal to discharge the output capacitor via an auxiliary capacitor when the output voltage is higher than a first predetermined threshold, and charge the output capacitor via the auxiliary capacitor when the output voltage is lower than a second predetermined threshold.

* * * * *